United States Patent
Arya et al.

(10) Patent No.: US 8,838,878 B2
(45) Date of Patent: Sep. 16, 2014

(54) METHOD OF WRITING TO A NAND MEMORY BLOCK BASED FILE SYSTEM WITH LOG BASED BUFFERING

(75) Inventors: Siamak Arya, Cupertino, CA (US); Dongsheng Xing, Fremont, CA (US)

(73) Assignee: Greenliant LLC, Santa Clara, CA (US)

( * ) Notice: Subject to any disclaimer, the term of this patent is extended or adjusted under 35 U.S.C. 154(b) by 468 days.

(21) Appl. No.: 12/791,767

(22) Filed: Jun. 1, 2010

(65) Prior Publication Data

US 2011/0296080 A1     Dec. 1, 2011

(51) Int. Cl.
*G06F 12/00* (2006.01)
*G06F 12/02* (2006.01)

(52) U.S. Cl.
CPC .... *G06F 12/0246* (2013.01); *G06F 2212/7202* (2013.01); *G06F 2212/7203* (2013.01)
USPC ........... 711/103; 711/101; 711/102; 711/104; 711/170

(58) Field of Classification Search
None
See application file for complete search history.

(56) References Cited

U.S. PATENT DOCUMENTS

| | | | |
|---|---|---|---|
| 2005/0182893 A1 | 8/2005 | Suh | |
| 2006/0064538 A1* | 3/2006 | Aizawa | 711/103 |
| 2007/0047314 A1 | 3/2007 | Goda | |
| 2008/0025097 A1 | 1/2008 | Aritome | |
| 2008/0189490 A1 | 8/2008 | Cheon | |
| 2008/0219053 A1* | 9/2008 | Kim | 365/185.11 |
| 2009/0006725 A1 | 1/2009 | Ito et al. | |
| 2009/0049229 A1* | 2/2009 | Honda et al. | 711/101 |
| 2009/0097318 A1 | 4/2009 | Sarin | |
| 2010/0011154 A1 | 1/2010 | Yeh | |

FOREIGN PATENT DOCUMENTS

| | | |
|---|---|---|
| JP | 2006-92169 | 4/2006 |
| JP | 2008-152464 | 7/2008 |

OTHER PUBLICATIONS

PCT Search Report and Written Opinion corresponding to the related PCT Patent Application No. US11/36664 mailed on Aug. 25, 2011.
Japanese Office Action dated Jan. 15, 2014 corresponding to the related Japanese Patent Application No. 2013-513196.
European Office Action dated Feb. 21, 2014 corresponding to the related European Patent Application No. 11790175.1.

* cited by examiner

*Primary Examiner* — Matthew Bradley
*Assistant Examiner* — Alan Otto
(74) *Attorney, Agent, or Firm* — DLA Piper LLP (US)

(57) ABSTRACT

A method of operating a controller for controlling the programming of a NAND memory chip is shown. The NAND memory chip has a plurality of blocks with each block having a certain amount of storage, wherein the amount of storage in each block is the minimum erasable unit. The method comprising storing in a temporary storage a first plurality of groups of data, wherein each of the groups of data is to be stored in a block of the NAND memory chip. Each group of data is indexed to the block with which it is to be stored. Finally, the groups of data associated with the same block are programmed into the same block in the same programming operation.

8 Claims, 5 Drawing Sheets

INDEX TABLE

| LOGICAL PAGE NO. | LOGICAL BLOCK NO. | PHYSICAL BLOCK ADDRESS | PHYSICAL PAGE ADDRESS |
|---|---|---|---|
| LOGICAL PAGE NO. | LOGICAL BLOCK NO. | PHYSICAL BLOCK ADDRESS | PHYSICAL PAGE ADDRESS |
| LOGICAL PAGE NO. | LOGICAL BLOCK NO. | PHYSICAL BLOCK ADDRESS | PHYSICAL PAGE ADDRESS |
| LOGICAL PAGE NO. | LOGICAL BLOCK NO. | PHYSICAL BLOCK ADDRESS | PHYSICAL PAGE ADDRESS |
| LOGICAL PAGE NO. | LOGICAL BLOCK NO. | PHYSICAL BLOCK ADDRESS | PHYSICAL PAGE ADDRESS |
| LOGICAL PAGE NO. | LOGICAL BLOCK NO. | PHYSICAL BLOCK ADDRESS | PHYSICAL PAGE ADDRESS |

FIG. 5

METHOD OF WRITING TO A NAND MEMORY BLOCK BASED FILE SYSTEM WITH LOG BASED BUFFERING

TECHNICAL FIELD

The present invention relates to a method of operating a NAND memory controller as well as a method to operate a memory device comprising a NAND memory controller and a NAND integrated circuit chip. The method of the present invention increases the performance of the NAND memory to perform random writes for block based flash file system.

BACKGROUND OF THE INVENTION

NAND memory integrated circuit chips are well known in the art. In a NAND memory chip, the memory is characterized by a number of blocks of storage, with each block containing a number of pages. A block is the minimum erasable unit. Thus, if a page in a block of NAND storage has already been written or programmed, it cannot be re-programmed or re-written again until the entire block with which the page is associated is erased. Therefore, in a block based flash file system (FFS), when replacing or overwriting a portion (such as a page) of a prewritten block, the overwrite data and the unchanged data portion of the block must be merged into a new erased block. Thus, as shown in FIG. 1, if pages 2 and 3 of the Original Block are to be over written, the new data for those pages are first saved in a Temporary Block, and then are merged with other pages of the Original Block into a Merged Block. Therefore, pages 0 and 1 are copied from the Original Block, pages 2 and 3 are copied from the Temporary Block, and the rest of the pages, from page 4 to end of the Original Block, are copied from the Original Block to the Merged Block. The Original and Temporary Blocks can then be erased for future use.

The merge operation can be very long when a block of NAND has 128 or 256 pages and moving each page may take multiple milliseconds. In addition, as the size of the blocks and programming time are increased, the merge time will increase.

Furthermore, in a NAND memory integrated chip, there are a large number of blocks, with only a few blocks allocated as Temporary Blocks. Referring to FIG. 2, there is shown a schematic level diagram of a NAND chip with one thousand (1,000) blocks of which nine hundred ninety two (992) blocks are allocated to storing data designated Data Blocks, while eight (8) blocks are allocated to Temporary Blocks. A typical write operation may be as follows. Let us assume that pages of data are to be written into Data Block 0, in locations where there is already pre-written data. Therefore, instead of performing the aforementioned merge operation, the new page(s) of data are first written into a Temporary Block, e.g. block 992, with block 992 assigned as being associated with Data Block 0.

If a page of new data is received by the NAND chip and it is destined for a page that is erased, anywhere in the Data Blocks 0-991, then the page of new data is written into that location. However, if the page of new data is destined for Data Block 0 where it is to write over another page of data, then it is stored in Temporary Block 992. Finally, if the page of new data is destined for a page, in a Data Block other than Data Block 0, e.g. Data Block 4, where it is to overwrite another page of data, then the page of new data is stored in Temporary Block 993, and Temporary. Block 993 is then associated with Data Block 4. Because the merge operation requires a long period of time, it is held off for as long as possible. This is done by storing the pages of new data in the Temporary Blocks. However, since in the prior art, very few Temporary Blocks are allocated (e.g. 8 blocks for every 1,000 blocks of data), because of the desire to use as many blocks for data as possible, the NAND memory chip will quickly run out of Temporary Blocks. For example, in the above example, if a ninth "write" operation is received for a page of new data which is to overwrite a ninth different Data Block, then a merge operation must first be performed to free up a temporary block. As NAND chips increase in storage capacity and the number of blocks increases, the likelihood of the NAND chip quickly requiring a merge operation to free up a temporary block increases.

One prior art solution to the problem of more closely resembling a true random write operation with the NAND chip having few merge operations before the page(s) of new data can be written was to have as many temporary blocks as data blocks. With a 1:1 ratio of temporary block to data block, the requirement for merge operation dramatically decreases. This solution however, results in far fewer data blocks available for storage of user data. Hence a new solution is desired.

SUMMARY OF THE INVENTION

This limitation is overcome by the present invention wherein a method of operating a controller for controlling the programming of a NAND memory chip is shown. The NAND memory chip has a plurality of blocks with each block having a certain amount of storage, wherein the amount of storage in each block is the minimum erasable unit. The method comprising storing in a temporary storage a first plurality of groups of data, wherein each of the groups of data is to be stored in a block of the NAND memory chip, with a group of data less than a block of data. Each group of data is indexed to the block with which it is to be stored. Finally, the groups of data associated with the same block are programmed into the same block in the same programming operation.

BRIEF DESCRIPTION OF THE DRAWINGS

FIG. 5 is an example of an Index Table for use with the present invention.

DETAILED DESCRIPTION OF THE PREFERRED EMBODIMENT

Figure 1:
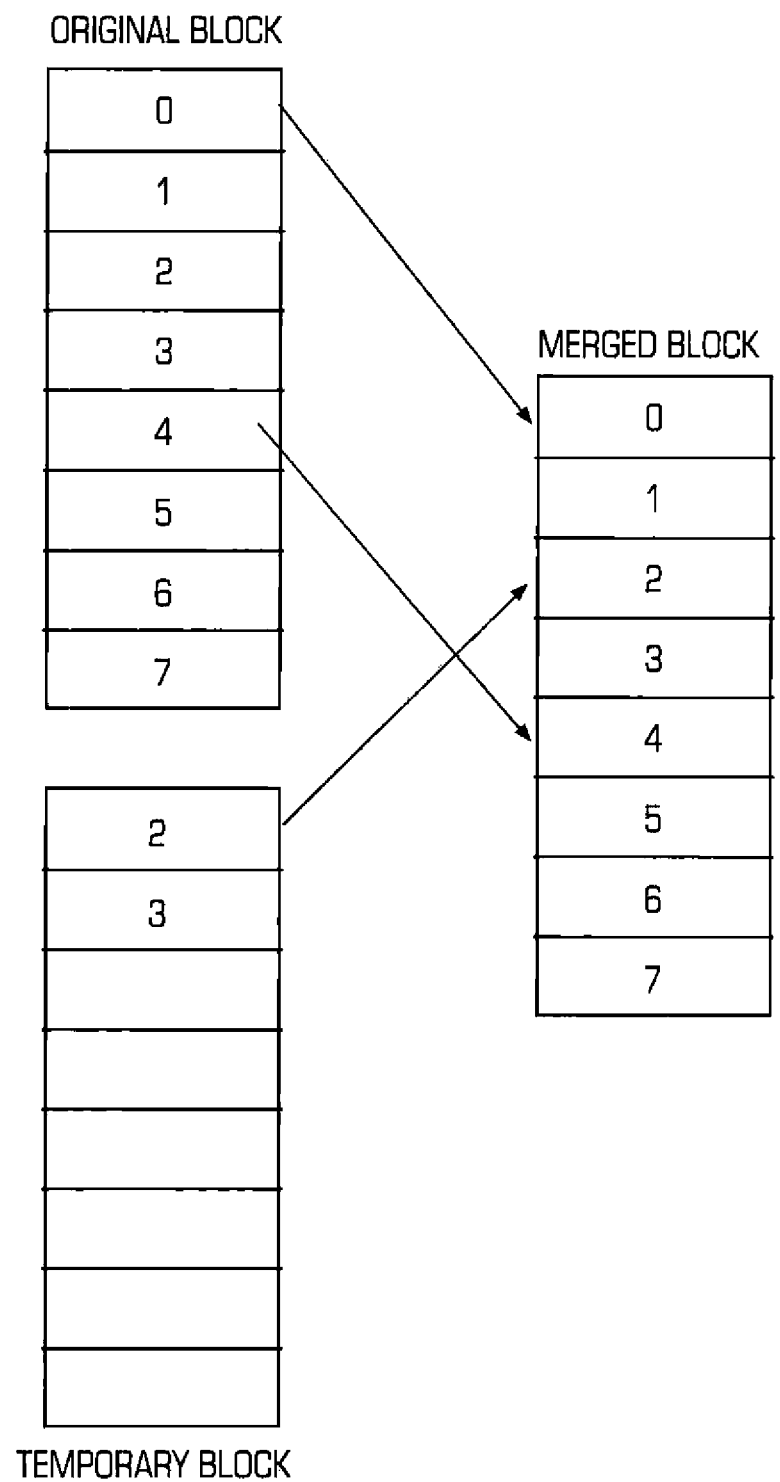
FIG. 1 is a block diagram of a merge operation of the prior art.
Figure 2:
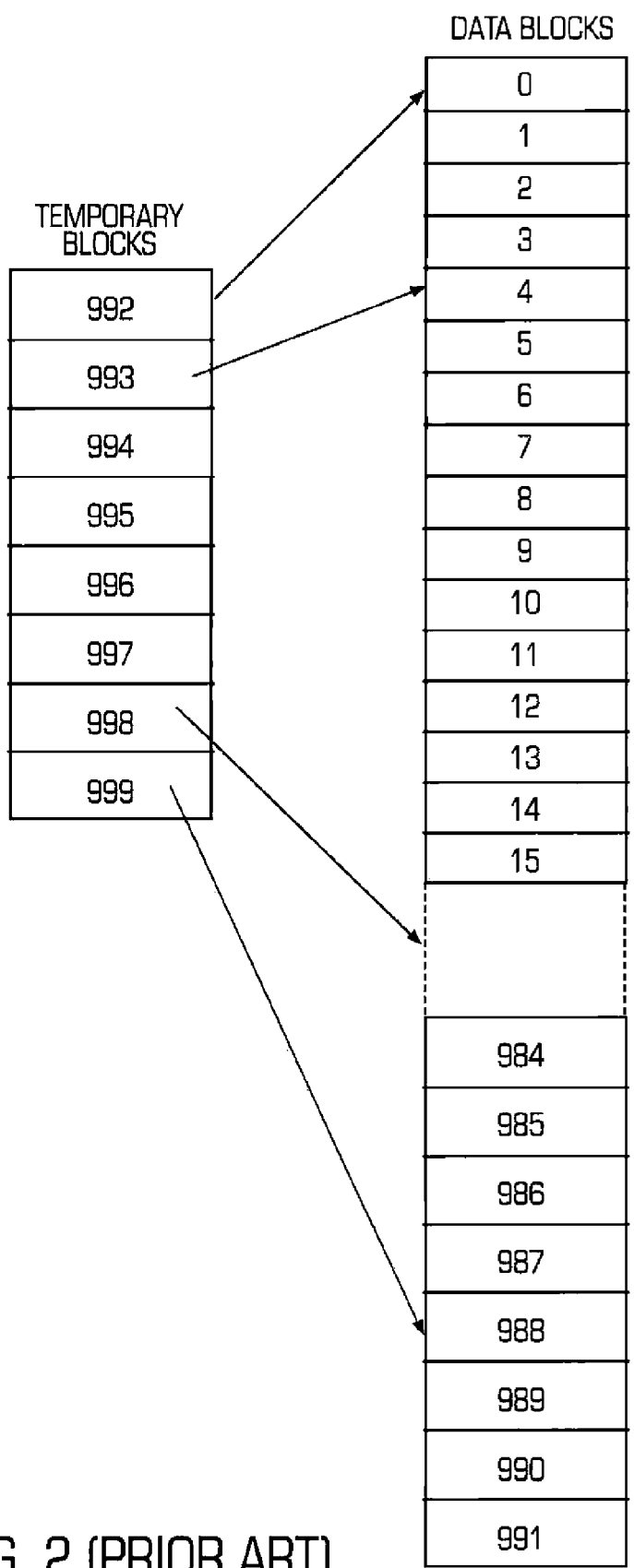
FIG. 2 is a block diagram of the assignment of temporary blocks to data blocks used for temporarily storing data during a write operation of the prior art.
Figure 3:
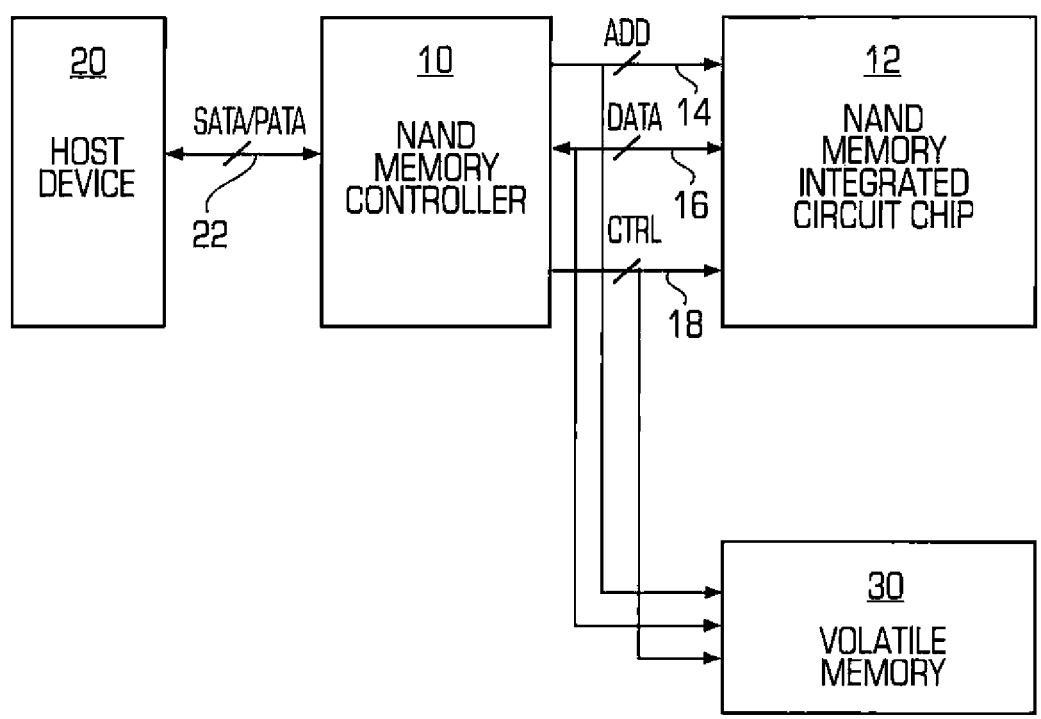
FIG. 3 is a block diagram of a controller operating with the method of the present invention to control a NAND memory chip and receiving commands from a host device.

Referring to FIG. 3 there is shown a block level diagram of a NAND memory controller 10 operating with the method of the present invention. The controller 10 interfaces with and controls the operation of a NAND memory integrated circuit chip 12, through well known buses, such as an address bus 14, a data bus 16 and a control bus 18. Typically for a NAND memory 10, the address bus 14 and the data bus 16 are the same, i.e. address and data are transferred over the same bus. Although the present invention is a method for operating the memory controller 10, the present invention can also be used to operate a memory device comprising the controller 10 and the NAND memory chip 12 packaged together as a memory module or even integrated together. The controller 10 can also interface with and is connected to a volatile memory 30. In that event, the address bus 14, the data bus 16 and the control bus 18 are also connected to the volatile memory 30.

The controller 10 interfaces with a host device 20, through well known protocols, such as PATA (parallel ATA) or SATA (Serial ATA) command protocols.

As described heretofore, the present invention solves the problem of improving the random write performance in a block based non-volatile memory system, by reducing the frequency of performing merge operations.

As previously discussed, because of the nature of the NAND memory chip 12, in order to write data into a pre-written page(s) of a block, the entire block must first be erased. In the method of the present invention, if the page of new data is to be written into a pre-written page of a Data Block, rather than erasing the entire data block, the page of new data is first written into the next available page in the Temporary Blocks. Similar to the prior art, the Temporary Blocks may be in the NAND memory chip 12.

However, unlike the prior art in which each Temporary Block is associated with a Data Block, and only those pages associated with that Data Block can be written into the same Temporary Block, with the method of the present invention, each page in the same Temporary Block may store data destined for storage in different Data Blocks. Thus, each Temporary Block may be utilized to store many pages of data for different Data Blocks before the pages of new data need to be written into the Data Blocks. Therefore, the frequency of the merge operation may be reduced with the ratio of one over the number of pages saved in the Temporary Blocks.

Figure 4:
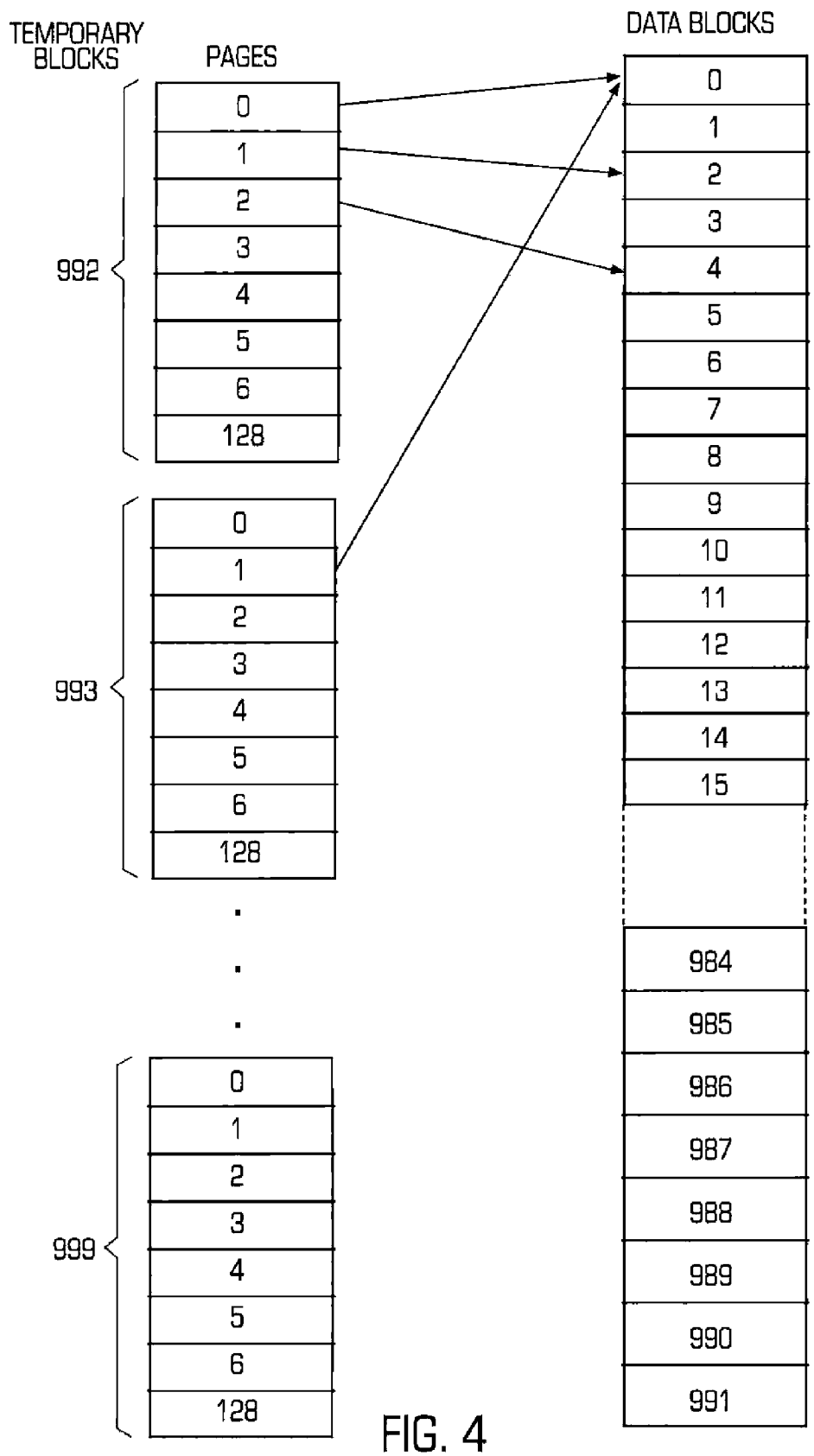
FIG. 4 is a diagram showing the address space for a NAND memory chip with Data Blocks and Temporary Blocks used in the method of the present invention.

For example, as shown in FIG. 4, page 0 of temporary block 992 may store data destined to be stored in Data Block 0. In the same Temporary Block 992, page 1 may store new data destined for storage in Data Block 2. Finally, in Temporary Block 992, page 2 may store data destined for storage in Data Block 4. Thus, unlike the prior art, pages in the same Temporary Block may store data destined for different Data Blocks. Furthermore, a different Temporary Block, such as Temporary Block 993, may store a page of new data (e.g. page 1) destined for storage in a Data Block (e.g. Data Block 0) that a page (e.g. page 0) of data in Temporary Block 992 was also destined for storage. In other words, pages destined for storage in the same Data Block may be stored in different Temporary Blocks. In the method of the present invention, as a new page of data is to be stored in the Data Blocks, and it is determined that that location is not erased, then the new page of data is stored in the next available page in the collection of Temporary Blocks. Thus, the Temporary Blocks maintain a log of pages of new data to be written into the Data Blocks.

To track the correlation between the pages of data in the Temporary Blocks and the ultimate destination for storage in the Data Blocks, an Index Table is created. The indexing can be done in a number of different ways, such as by physical address, or by logical address. One example is shown in FIG. 5. FIG. 5 shows a physical address Index Table. Each row of the Index Table represents the page of data stored in the Temporary Block that contain information regarding the physical address where the page is temporarily stored and the page address of the final destination of the page of data. These addresses can be in the form of Block Address or Page Address as described below.

"Logical Page Number" refers to the page in the Data Block that will be ultimately updated with this page of new data.

"Logical Block No." refers to the block number in the Data Block in which the page of new data is to be ultimately written.

"Physical Block Address" refers to the physical address of the Temporary Block where the page of new data is held.

"Physical Page Address" refers to the physical page address in the Temporary Block that holds the new data prior to updating the new data into the Data Blocks.

In the method of the present invention, a new page of data is received by the NAND memory controller 10 from the host device 20. The controller 10 checks the location in the Data Blocks where the page of new data is to be written to determine if the location contains erased memory cells or pre-written data. If the location contains erased memory cells, then the page of new data is written into that location. If, however, the location contains pre-written data, then the page of new data is written into the next available erased page in the Temporary Blocks. The controller 10 then updates the index Table as to where the new page of data is to be written, which includes the logical address of the new page of data, and the associated physical address of where the new page of data is to be temporarily written. Other tables conventional in the operation of a NAND memory device, and well known to those skilled in the art, such as mapping of logical to physical blocks, and mapping of temporary block numbers to physical blocks must also be maintained and updated.

Because each Temporary Block is not associated with a unique Data Block, the accumulated number of pages of new data destined for locations where there is pre-existing data can be much larger. Thus, the frequency of performing merge operations can be reduced. For a Temporary Block having 256 pages, one Temporary Block can store 256 pages destined for 256 different Data Blocks or multiple pages per Data Block. If there are eight Temporary Blocks, then there could be as many as 2048 different Data Blocks to which the eight Temporary Blocks can serve as a buffer or storage area. Further, if these Temporary Blocks serve 128 Data Blocks, each Data Block can have an average of 16 pages accumulated in the Temporary Blocks before a merge operation needs to be performed. In contrast, in the prior art, a single Temporary Block can serve as a buffer for only one Data Block, and eight Temporary Blocks can serve as a buffer for only eight different Data Blocks. The trade-off, of course, is the need to create an Index Table. The Index Table can be stored in a volatile memory 30 or even in the NAND memory 12 itself. The advantage of the Index Table being stored in the volatile memory 30 is the speed of retrieval. The disadvantage is the volatility, which can cause data to be lost in the event of an abrupt power severance.

The operation of merging the pages of new data from the Temporary Blocks into the Data Blocks can be done opportunistically, when there is a lull in requiring the resources of the NAND chip 12, or deterministically, at specified intervals or events. In the event of opportunistic merging, a merge operation can be performed without causing any delay to host commands. During the merge operation, the controller 10 gathers all of the pages of new data from the Temporary Blocks that are to be stored in the same Data Block, and merges those new pages of data with the non-replaced pages of data from the same block and writes them into an erased data block. The original Data Block is then erased, and the pages of new data and the associated data, such as Block No., physical address and logical address are then deleted from the Temporary Blocks and from the Index Table.

The merge operation can occur in one of two ways. In one manner all of the pages in the Temporary Blocks are written into the Data Blocks. This is followed by an erase of all the Temporary Blocks, and the Index Table. In this manner, because there may be a large number of pages stored in the Temporary Blocks, the merge operation may take a long time.

In a second manner the merge operation may update only one or a few Data Blocks at a time. In this manner of operation, the pages that are destined for the same Data Block, which may be stored in a plurality of different Temporary Blocks, are selected from the Temporary Blocks and written into the same Data Block(s). In this approach however, since not all of the pages of data from the Temporary Blocks were written into the Data Blocks by the merge operation, only the written pages must be erased from the Temporary Blocks. However, because each Temporary Block is also a "block" of data, which means all of the data in that block must be erased together, there must be a so-called "garbage collection" operation done. In a "garbage collection" operation, which is well known in the art, the unmerged pages of data in the same Temporary Block are transferred to a fully erased block of the Temporary Block so that the Temporary Block can then be erased. In addition, the indexing Table must similarly be purged of those entries referencing the pages of data that were written during the merge operation. Therefore, although the second technique of merging only pages for only one or a few Data Blocks does not require a lengthy contiguous merge operation, it does require an additional subsequent "garbage collection" process, which creates additional overhead.

If a read request is made to the controller 10, before the new pages of data are merged into the Data Blocks, the controller 10 uses the logical address supplied by the host device 20 as a part of the read request to read the location of the page of new data from the Index Table. If the logical address is not contained in the Index Table, indicating that the data is in the Data Blocks and has not been replaced, then the controller 10 uses the logical address to search the Data Blocks to read the page of data.

As can be seen from the foregoing, because the Temporary Blocks save each page of new data and are not associated with any one particular Data Block, with the method of the present invention the Temporary Blocks can hold more pages of new data before one or more merge operations need to be performed. In addition, when there is a merge operation, more pages from the same Temporary Block can be stared in the same merge operation than with the method of the prior art.

What is claimed is:

1. A method of operating a controller for controlling the programming of a NAND memory chip, wherein said NAND memory chip has a plurality of blocks with each block having a plurality of groups of storage, wherein the amount of storage in each block is the minimum erasable unit, wherein said method comprising:

storing a plurality of groups of data in a plurality of blocks of a temporary storage, wherein at least two of the groups of data in one of the plurality of blocks of the temporary storage are to be stored in different blocks of the plurality of blocks of said NAND memory chip, and wherein at least two of the groups of data in different ones of the plurality of blocks of the temporary storage are to be stored in the same block of the plurality of blocks of said NAND memory chip;

indexing, in an index table, each of the groups of data in the blocks of temporary storage to a group of storage in the block in the NAND memory chip where it is to be stored;

identifying all of the plurality of groups of data stored in the temporary storage which are to be stored in the same block of the plurality of blocks of said NAND memory chip;

writing all the identified a plurality of the groups of data from the temporary storage along with data stored in the same block into an erased block of the NAND memory chip different from the same block of the NAND memory chip;

deleting the groups of data from the temporary storage that were written to the erased block; and deleting, from the index table, the index for the groups of data deleted from the temporary storage.

2. The method of claim 1 wherein each of the plurality of groups of storage is a page.

3. The method of claim 1 wherein said indexing step comprises:

creating a table of the logic address to the physical address of the groups of data written into the temporary storage.

4. The method of claim 1 wherein said writing step writes all of the groups of data from the temporary storage.

5. The method of claim 4 wherein said deleting the groups of data deletes all of the groups of data from the temporary storage.

6. The method of claim 5 wherein said deleting from the index table step deletes all of the index.

7. The method of claim 1 wherein said deleting the groups of data step further comprises:

deleting only the groups of data that were written and performing a garbage collection step to consolidate the remaining groups of data in the temporary storage.

8. The method of claim 7 wherein said deleting from the index table further comprises:

deleting only the index for the groups of data written and performing a garbage collection step to consolidate the remaining indices in the index table.

* * * * *